United States Patent [19]

Lewis, III et al.

[11] Patent Number: 4,610,884

[45] Date of Patent: Sep. 9, 1986

[54] CONFECTIONERY CREMES

[75] Inventors: Robert B. Lewis, III; Robert L. Prosise, both of Cincinnati, Ohio

[73] Assignee: The Procter & Gamble Company, Cincinnati, Ohio

[21] Appl. No.: 795,753

[22] Filed: Nov. 8, 1985

Related U.S. Application Data

[63] Continuation-in-part of Ser. No. 626,182, Jun. 29, 1984, abandoned, which is a continuation-in-part of Ser. No. 512,043, Jul. 7, 1983, abandoned.

[51] Int. Cl.⁴ .......................... A23G 3/00; A23D 5/00
[52] U.S. Cl. .................................. 426/103; 426/572; 426/613; 426/660
[58] Field of Search ............... 426/103, 572, 606, 607, 426/608, 613, 660

[56] References Cited

U.S. PATENT DOCUMENTS

| | | |
|---|---|---|
| Re. 30,086 | 8/1979 | Carlile et al. . |
| 2,359,228 | 9/1944 | Lloyd et al. . |
| 2,422,536 | 6/1948 | Eckey . |
| 3,006,771 | 10/1961 | Babayan . |
| 3,012,891 | 12/1961 | Best et al. . |
| 3,084,049 | 4/1963 | Sinnema . |
| 3,244,536 | 4/1966 | Kidger . |
| 3,253,928 | 5/1966 | Bedenk et al. . |
| 3,307,953 | 3/1967 | Siebers . |
| 3,325,293 | 6/1967 | Meyer . |
| 3,353,964 | 11/1967 | Seiden . |
| 3,431,116 | 3/1969 | Feuge et al. . |
| 3,512,994 | 5/1970 | Brown et al. . |
| 3,600,196 | 8/1971 | Heine et al. . |
| 3,615,682 | 10/1971 | LaBaw et al. . |
| 3,676,155 | 7/1972 | Horn et al. . |
| 3,686,240 | 8/1972 | Kawada et al. . |
| 3,862,341 | 1/1975 | Johannes . |
| 3,874,924 | 4/1975 | Sands et al. . |
| 3,889,011 | 6/1975 | Read . |
| 3,914,453 | 10/1975 | Gawrilow . |
| 3,917,874 | 11/1975 | Sands et al. . |
| 3,935,324 | 1/1976 | Persmark et al. . |
| 3,949,105 | 4/1976 | Wieske et al. . |
| 3,961,980 | 6/1976 | Dunshee . |
| 4,045,583 | 8/1977 | Jeffery et al. . |
| 4,081,559 | 3/1978 | Jeffery et al. . |
| 4,151,308 | 4/1979 | Ziccarelli et al. . |
| 4,160,850 | 7/1979 | Hallstrom et al. . |
| 4,335,156 | 6/1982 | Kogan et al. . |
| 4,350,715 | 9/1982 | Rek . |
| 4,379,176 | 4/1983 | Scherwitz et al. . |
| 4,390,561 | 6/1983 | Blair et al. . |
| 4,396,639 | 8/1983 | Bodor et al. . |
| 4,425,371 | 1/1984 | Stratmann et al. . |
| 4,438,149 | 3/1984 | Verhagen et al. . |

FOREIGN PATENT DOCUMENTS

| | | |
|---|---|---|
| 0072212 | 2/1983 | European Pat. Off. . |
| 1294426 | 10/1972 | United Kingdom . |
| 2033721A | 5/1980 | United Kingdom . |
| 1341963 | 12/1983 | United Kingdom . |

OTHER PUBLICATIONS

*Cookie & Cracker Technology*, 2nd Ed., Matz, S. A. and Matz, T. D., The AVI Pub. Co., Inc., Westport, CT (1978), pp. 196-198.

*Primary Examiner*—Robert Yoncoskie
*Attorney, Agent, or Firm*—Edmund F. Gebhardt; Rose Ann Dabek; Richard C. Witte

[57] ABSTRACT

A substantially water-free creme having from about 20% to about 50% of a rapidly melting confectionery fat and 50% to about 80% of a carbohydrate is disclosed. This creme has a disordering temperature of between 80° F. and less than 102° F. and a melt rate of 15 seconds to 75 seconds at 92° F. It has a back extrusion force of from about 0.3 to about 6 lbs at 70° F. Disordering temperature relates to the temperature at which the creme and saliva mixture forms a water-continuous phase. The back extrusion force is a measure of the apparent viscosity of the creme. The creme's viscosity remains stable over a broad temperature range.

38 Claims, 11 Drawing Figures

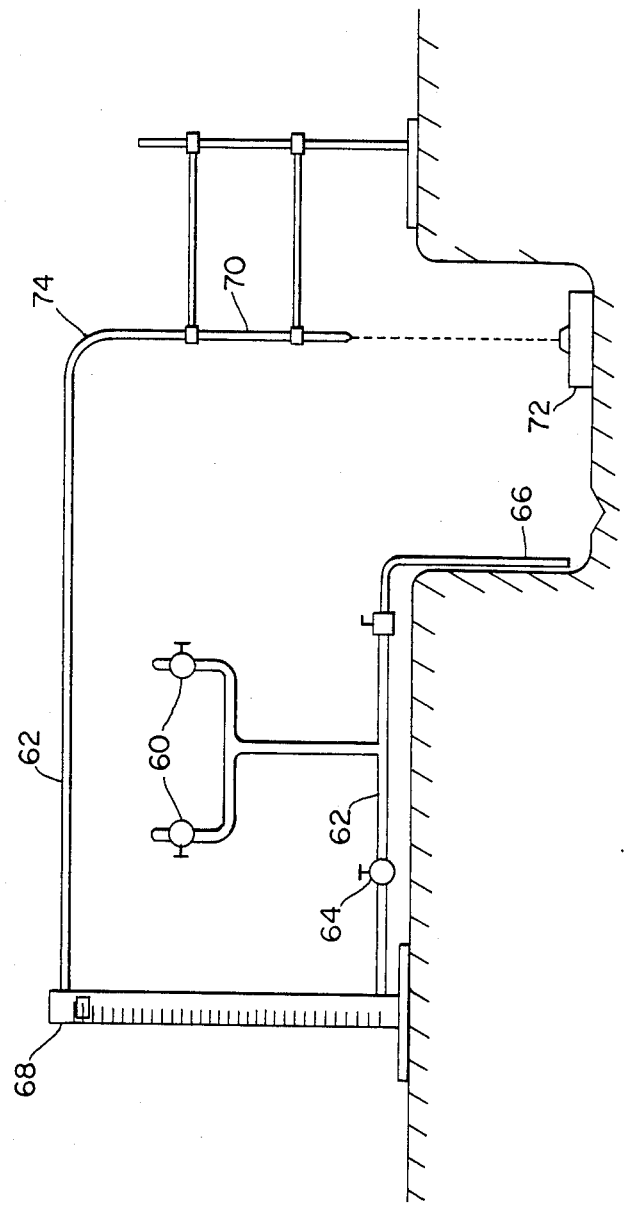

CONFECTIONERY CREMES

This application is a continuation-in-part, of application Ser. No. 626,182, filed 6/29/84, now abandoned which in turn is a continuation-in-part of application Ser. No. 512,043, filed July 7, 1983 now abandoned.

FIELD OF INVENTION

This invention relates to a substantially water-free creme or icing which is quick melting; this creme is particularly useful on sandwich cookies.

BACKGROUND OF THE INVENTION

Cremes or buttercream icings contain substantial portions of fat and shortening and are usually whipped to incorporate air. These cremes are used to make sandwich cookies, as for example, the filling between two chocolate, vanilla-flavored, oatmeal, and lemon base cakes. Confectionery cremes can also be applied to cakes, sweet rolls, and pastries as toppings or fillings. The basic ingredients of icings are usually sugar, water and fat. However, for use in a sandwich cookie context or where the cake or roll is substantially dry, it is important that the creme be substantially water-free. Even one percent of water in the icing or creme can cause the water to leach into the base cake making the cookie soggy and soft.

Conventional creme icings tend to be very thick and viscous. This is because of the high level of higher melting fat required to keep the product stable at elevated storage temperatures and manufacturing conditions. In general, conventional icings become more fluid and less viscous as the temperature is raised; i.e. they melt. An icing which is fluid at room temperature and remains fluid or does not change its viscosity appreciably upon storage is desired for taste and texture in the mouth. Therefore, it is an object of the present invention to prepare a storage-stable confectionery creme having improved viscosity benefit. This creme remains fluid and does not melt upon prolonged storage, even at normal storage temperatures.

Another object of this invention is to prepare a creme filling which provides a rapid mouthmelt and creamy or dairy flavor impression.

It is another object of this invention to provide a creme which has a good flavor delivery system, i.e. the creme rapidly melts in the mouth and disperses both the fat and the sugar flavor throughout the mouth.

It has been discovered according to this invention that excellent properties with respect to the firmness and melting of icings can be incorporated into this creme by using a specially compounded confectionery fat having specific melting properties and disordering temperatures. Moreover, it is highly preferred that the sugar particle size distribution be such that the average particle size is less than 30 microns, and the majority of the particles are less than 15 microns. The sugar along with the fat gives the structure to the creme.

SUMMARY OF THE INVENTION

A substantially water-free confectionery creme consisting of:
  (a) 50% to 80% of a carbohydrate having an average particle size of less than 30 microns;
  (b) 20% to 50% of a confectionery fat, said fat having a complete melting point of about 80° F. to about 98° F.;
  (c) 0% to about 2% emulsifier;
said creme being characterized by:
  (a) a back extrusion force of from about 0.3 to about 6 lbs at 70° F., ordinarily from about 0.3 to about 3 lbs. at 70° F.;
  (b) a disordering temperature of less than 102° F. and
  (c) a melt rate of from about 15 seconds to about 75 seconds at 92° F.

The density of the creme is between 0.7 g/cc and 1.2 g/cc.

Preferably the fat has a solid fat content of:
  (1) about 10% to about 55% at 50° F.;
  (2) about 3% to about 17% at 70° F.;
  (3) about 1% to about 5% at 80° F.;
  (4) less than about 2% at 92° F.; and
  (5) less than about 1% at 105° F.

DESCRIPTION OF FIGURES

FIG. 3 is a fat-continuous phase.

FIG. 4 shows the beginning of the disordering.

FIG. 5 shows partial disordering (or inversion).

FIG. 6 shows a saliva-continuous mixture of the fat and saliva. The temperature of the fat/saliva mixture went from 78° F. in FIG. 3 to 87° F. in FIG. 6.

FIG. 7 (81° F.) shows the fat-continuous system;

FIG. 8 is partially disordered or inverted (83° F.); and

FIG. 9 (85° F.) is a saliva-continuous emulsion (or dispersion).

FIG. 11 illustrates the melt rate test station.

DEFINITIONS

Figure 1:
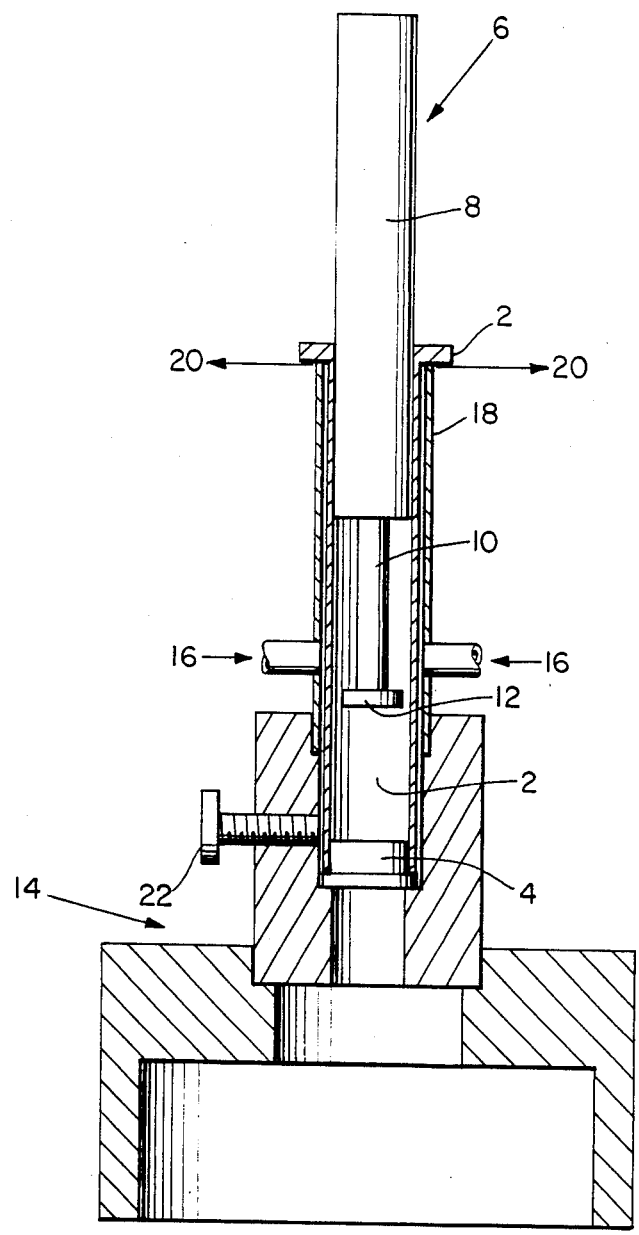
FIG. 1 is a diagram of the instrument used to measure back extrusion force of the confectionery creme.

"Disordering temperature" is the temperature at which the fat (either alone or in the creme) mixes with synthetic saliva to form an oil-in-water emulsion or dispersion. A method for measuring this temperature is described in the section on testing methods.

"Solid fat content" is an approximation of the amount of solids in a fat sample at a given temperature. Solid fat content gives the melting profile of the fat.

"Complete melting point" is the temperature at which no solids are visible in the fat sample.

"Back extrusion force" is a measure of the apparent viscosity of the creme or fat. It measures the change in flow and viscosity as a function of temperature changes.

"Substantially water-free" means that less than 0.3% water is present in the confectionery creme.

"Comprising" as used herein means that other ingredients may be present in the composition, fat or creme, so long as they do not change the required physical properties of the fat or creme. The term "comprising" encompasses the terms "consisting of" and "consisting essentially of".

DETAILED DESCRIPTION OF THE INVENTION

The confectionery creme is comprised of from about 20% to about 50% of a confectioners fat and 50% to about 80% of carbohydrate. This confectionery creme is substantially water-free.

By substantially water-free is meant that the creme contains less than about 0.3% water. This includes the water hydrated with the carbohydrate, as for example starches which have not been dried.

The creme is characterized by:
(1) a back extrusion force of 0.3 to 6.0 lbs. at 70° F.;
(2) a disordering temperature less than 102° F.;
(3) a melt rate of about 15 seconds to about 75 seconds at 92° F.; and
(4) a density of from about 0.7 to about 1.2 g/cc.

The fat level is preferably from about 20% to about 40% of the creme.

Preferably the creme is made with the confectioners fat described herein.

1. Carbohydrate Component

Any carbohydrate normally used in confections is suitable for use in the creme or icing prepared herein. Such sugars include sucrose, dextrose, fructose, maltose, and other solid sugars. Because of its wide availability, sweetening power, and crystalline structure, sucrose is a preferred sugar. Other carbohydrates such as starches and dextrins as well as modified starches can also be used. Normally, because of their lower sweetening power the starches will be used at a level of from 0% to about 40%, preferably from about 5% to about 20%. The preferred starches are corn starch, wheat starch, modified corn starch, rice starch and tapioca starch.

Mixtures of starches and other carriers with artificial sweeteners can also be used herein.

Preferred carbohydrate compositions have a particle size distribution such that the average particle size is below 30 microns. While it is possible to use carbohydrates with an average particle size up to 50 microns average particle size to make the cremes herein, sugar having a majority of particles above 30 microns in size tends to be gritty tasting. The sugar contributes substantially to the structure of the confectionery creme, therefore it is preferred to have a particle size distribution as described in Table I to impart the creamy taste and smooth texture to the confectionery creme.

TABLE I

| Particle Size | Percent |
|---|---|
| Greater than 25 microns | 2% or less |
| 10 to 25 microns | 15% or less |
| Less than 10 microns | 83% or less |

2. Emulsifiers

Emulsifiers are added to the confectionery creme at a level of 0% to about 2%, and preferably at a level of about 0.05% to about 1%. Emulsifiers aid in the incorporation of air into the creme as well as the dispersion of the creme in the mouth.

The preferred emulsifiers are mono- and diglycerides, polyglycerol esters, lecithin, sorbitan esters of fatty acids, polyethoxylated esters of sorbitan, such as Polysorbate 80 and Tween-60 and Tween-80, and other edible emulsifiers. Mixtures of emulsifiers can also be used.

3. Other Additives

Binders which inhibit the agglomeration of the small sugar particles such as those commonly used in 6X and 10X sugar can be added. Cornstarch is one such material.

Flavorants can also be added to the confection. These include nonfat dairy milk solids, chocolate, cocoa, fruit flavors such as, strawberry, lemon, cherry and peach, cheese flavors and cream flavors.

Antioxidants and mold inhibitors and other common confection additives known to those skilled in the art can be added to the creme herein.

4. Description of the Fat

A. Triglyceride Composition

Any edible triglyceride can be used to make up the fat blend having the requisite melting profile (solid fat content), complete melting point and disordering temperature. The naturally occurring triglycerides derived from vegetable sources preferred for use herein include soybean oil, corn oil, cottonseed oil, coconut oil, peanut oil, palm kernel oil, palm oil, rapeseed oil, safflower oil, sesame oil, and sunflower seed oil. The marine and animal oils such as sardine oil, menhaden oil, babassu oil, lard, and tallow can also be used. Any natural or synthetic triglyceride of fatty acids having chain lengths of from 8 to 24 carbon atoms can be used. However, oils containing higher percentages of the longer chain saturated fatty acids ($C_{20}$–$C_{24}$), for example rapeseed oil, can only be used in limited amounts because of their higher melting points.

The substantially completely hydrogenated triglyceride hardstock materials having fatty acid chain lengths above 14 should also be limited. These fats generally have iodine values of less than 12 and melt above 100° F. Less than 5% and preferably from 0% to 1% hardstock can be in the fat. Hardstocks include such triglycerides as tristearin, tripalmitin, and palmitodistearin.

The iodine value (IV) of an oil or fat indicates the number of grams of iodine equivalent to the halogen absorbed by a 100 gram sample. In general, the lower the iodine value of a given fat or oil, the greater will be the content of solids at a given temperature. That is, as the triglyceride molecules become more saturated by the addition of hydrogen (the double bond content decreases) the consistency of the fat or oil becomes more solid.

While it is possible to prepare a fat having the melt properties, disordering temperature, and solid fat content claimed herein by controlled hydrogenation of a fat or special fractional crystallization of the fat, the preferred method is by blending fats or triglycerides to obtain the proper profile. One way to control the solid fat content, melt point, and disordering temperature is by controlling the amount of the fatty acid triglycerides having particular chain lengths. In general, the lower the fatty acid carbon chain length of the triglyceride, the lower the melting point. For example, coconut oil which is predominantly lauric acid ($C_{12}$) triglyceride can be used at high levels even if it is completely hydrogenated; i.e. having an iodine value of 0 to 130. Triglycerides containing longer chain fatty acids, palmitic, stearic, oleic, linoleic, and linolenic acids are preferably blended with triglycerides of lauric and myristic acids.

A preferred fat blend is a mixture of coconut oil (10% to 60%), a hydrogenated soybean oil having an iodine value of between 75 and 110 (20% to 70%) and a hydrogenated soybean oil having an iodine value of 35 to 75 (5% to 30%). Also preferred are blends of coconut oil, soybean oil (IV 75-110) and cottonseed oil (IV 50-85).

The term "coconut oil" when not otherwise characterized is used herein to include coconut oil which is hydrogenated and coconut oil which is not hydrogenated. Preferably, the coconut oil is touch hardened and has an IV ranging from about 1.5 to about 4.

Preferably, the fat will contain:
(a) from about 0% to about 30% short chain fatty acid triglycerides ($C_8$–$C_{12}$);
(b) from about 10% to about 99% $C_{14}$–$C_{18}$ saturated and unsaturated fatty acid triglycerides; and
(c) from about 0% to about 5% triglycerides having $C_{20}$–$C_{24}$ fatty acids. The level of oleic acid and linoleic acid triglycerides is from 5% to 85% (monounsaturated $C_{18}$ fatty acids and diunsaturated $C_{18}$ fatty acids).

Coconut oil and palm mid-fractions are rapidly melting and are therefore useful starting materials. The preferred palm mid-fraction is solvent fractionated or doubly fractionated palm oil made by crystallization as for example in Pike et al, U.S. Pat. No. 4,205,095 (1980) and the fraction used in the margarine oil product of Blair et al, U.S. Pat. No. 4,390,561 (1983).

Mixtures of this palm mid-fraction with oils containing low amounts of solids, i.e. those having less than 1% solids at 50° F. and 0% solids at 70° F. can be used herein. Preferred mixtures are the palm mid-fraction with soybean oil, sunflower oil and safflower oil.

a. The Melting Point

The fat blend has a complete melting point from about 80° F. to about 98° F. Preferably the complete melting point will be between about 80° F. and about 92° F. The temperature of the mouth is approximately 90° F. to 98° F. In order to make a confection or creme which rapidly melts in the mouth and does not produce a waxy or coated taste in the mouth, the confectionery fat should completely melt by about 98° F. Otherwise, the solid fat particles coat the mouth.

The fat should, however, be substantially solid at temperatures up to about 75° F. so that the confections made therefrom have stability at room temperature.

b. Melt Profile (Solid Fat Content)

The melt profile or solid fat content of the fat is also important to making the creme of this invention. The solid fat content of the confectionery fat should exhibit this profile:

| Temperature | Solid Fat Content (%) |
| --- | --- |
| 50° F. | about 10 to about 55 |
| 70° F. | about 3 to about 17 |
| 80° F. | about 1 to about 10, often about 1 to about 5 |
| 92° F. | 0 to about 2 |
| 105° F. | less than about 1 |

Preferred herein are fats exhibit a rapid melt profile, that is, a low degree of solids between 70° and 92° F. The fat must contain some solids in the 70°–80° F. range however to lend structure at room temperature to a creme made from the fat.

Preferably, the fats herein will have the following solid fat content:

| Temperature | Solid Fat Content (%) |
| --- | --- |
| 50° F. | 15 to 47 |
| 70° F. | 4 to 12 |
| 80° F. | 2.5 to 5.0 |
| 92° F. | 0 to 2.0 |
| 105° F. | 0 to 0.5 |

The solid fat content of cocoa butter at 70° F. and 80° F. is above 50%, but near zero at 98° F. This melt profile gives cocoa butter the rapid mouthmelt and cooling sensation, since most all the fat crystals melt between 80° F. and 95° F.

Margarine oils, which are used to make butter substitutes, i.e. a water-in-oil emulsion, can have solid fat contents similar to the confectionery fat in the lower temperature range but generally have higher solid fat contents at 92° F. and 105° F., usually 3% to 10%, due to higher levels of hardstock.

c. Disordering Temperature

When a fat is placed in the mouth it mixes with the saliva and initially forms (1) an oil continuous phase (water-in-oil emulsion); or (2) a distinct nondispersed oil and saliva mixture. As the fat melts, the water-in-oil emulsion inverts and becomes a water-continuous phase (emulsion). Likewise in the case of the oil/water mixture, an oil-in-water emulsion is formed. If all of the fat does not disperse or disorder in the saliva rapidly, a waxy or coated taste (texture) is perceived. Both melting point and disordering (or inversion) temperature are critical to producing a confectionery fat which leaves a clean, pleasant feeling and taste in the mouth. The fat herein is characterized by having a disordering temperature of less than 102° F. and preferably less than 98° F. and most preferably between 65° F. and 98° F.

d. Back Extrusion Force

The back extrusion force measures the apparent viscosity of the fat. The fats herein have a back extrusion force of from about 0.5 lbs. force to about 4.0 lbs. force at 70° F., and preferably from about 0.5 lbs. force to about 2.0 lbs. force at 70° F.

B. Preparation of the Confectionery Fat

The mixture of fats is heated at a temperature in excess of the melting point of the triglycerides, this will usually be between 120° F. and 160° F. This insures that no fat crystals are present to serve as seed crystals and also insures good mixing of the fats. The melted mixture is then pumped through a scraped wall heat exchanger in which the oil is rapidly chilled to a temperature of from about 40° F. to about 70° F. A suitable device for this purpose is a freezer or a Votator as is used in the margarine industry. Heat exchangers such as scraped wall, thin film and plate and frame heat exchangers are also useful herein. The fat blend can also be crystallized or worked by passing it through an extruder or "picker box" after it is cooled. The amount of crystallization and type of crystallization in the fat change with the type of freezer and the work input in the picker box.

Various other additives can be used in the confectioners fat of this invention to provide stability or to act as emulsifiers in creme or confectionery compositions. Common shortening and icing additives include the higher fatty acid esters of sucrose and sorbitan, polyoxyethylene sorbitans (Polysorbate 80), the lactic acid esters of mono- and diglycerides, citric acid esters of mono- and diglycerides, or of other higher fatty acid containing polyol partial esters; propylene glycol monoesters, polyglycerol mono- and di-esters, lecithin, mono- and diglycerides and other emulsifiers.

Other ingredients commonly added to shortening, fats and oils such as antioxidants, i.e. butylated hydroxy toluene, butylated hydroxy anisole and citric acid, can also be added. Conventional mold inhibitors such as sorbic acid, potassium sorbate, dihydroacetic acid and sodium benzoate can also be added to the confectionery fat, particularly when it is to be used as an icing. The preferred antimicrobial agent is sorbic acid at a concentration in the range of 0.05% to about 1.5%.

Preparation of the Confectionery Creme

The confectionery creme is prepared by conventional methods. The confectionery fat is creamed at temperatures of from about 40° F. to about 80° F. for from about 1 to about 6 minutes in a conventional mixer. This mixer can be run at from about 110 rpm to about 360 rpm. The sugar is then added to the fat in small portions, about ⅛ each time. After each sugar addition the sugar/shortening mixture is mixed again. After the last of the sugar is added the mixture is then beat for 2 to about 5 minutes to incorporate additional air.

In general, the extent of aeration of the confectionery creme is from about 88% to about 42% by volume. Creaming incorporates the air as small bubbles. Other methods of reducing the density of the creme such as direct injection of air, nitrogen, or nitrous oxide, can be used. Preferably, the amount of air will be less than about 50% by volume.

The density of the creme is about 0.7 to about 1.2 g/cc. The extent of aeration controls the density.

The minor additives, other than the sugar and the starch, can be added to the confectionery fat during the initial creaming step or with the sugar. These additives can also be added to the molten fat before it is crystallized. The point in the process where the antioxidants, mold inhibitors, and flavorants are added is not critical.

Characteristics of the Creme a. Melt Rate

The cremes herein have a melt rate of 15 seconds to about 75 seconds, preferably from about 15 seconds to about 60 seconds at 92° F. The melt rate is the rate at which the creme melts in a hot water stream at constant flow rate and temperature. The faster the creme melts, the more quickly the flavor is released in the mouth. The melt rate contributes to the flavor release as well as the way the creme blends with the base cake during mastication.

b. Disordering Temperature

As with the fat, the disordering temperature of the creme is important. This is the temperature at which the creme forms a water-continuous emulsion when mixed with synthetic saliva. A disordering temperature of less than 102° F. is required for an acceptable creme of this invention. Preferably this temperature will be below about 98° F. Most preferably, the disordering temperature will be between 80° F. and 98° F.

The lower the disordering temperature, the better the flavor release from the creme (it is faster). The disordering temperature also affects the mouthfeel. A temperature below 102° F. provides a creamy pleasant texture in the mouth. The disordering temperature is related to the blending of the creme with the base cake crumb of a sandwich cookie during mastication.

c. Back Extrusion Force

Back extrusion force is the measure of the apparent viscosity and flow properties of the creme. A high back extrusion force means that the creme is stiff and has a higher resistance to flow. The change in flow and viscosity as a function of temperature is due to the melting of the fat crystals in the creme. The preferred cremes herein will have similar back extrusion forces at 70° F. and at 80° F. This is a good indicator of the temperature stability of the cremes.

The cremes herein have a back extrusion force of from about 0.3 lbs. force to about 6 lbs. force at 70° F.

d. Cycling Stability

The cremes herein maintain their texture and viscosity during temperature cycling. Temperature cycling is the exposure of the cremes to higher than normal storage temperatures for a period of time, usually measured in hours, and their return to normal temperatures.

When these products are used as a creme filling on a chocolate-base cake, they are significantly preferred.

TESTING METHODS

A. Disordering Temperature Testing

Preparation of Synthetic Saliva

A 300 g batch of synthetic saliva solution is prepared in the following manner. All equipment (beakers, mixers, etc.) is sterilized before using it. First, 0.120 g of amylase is added to 298.875 g of a synthetic saliva base stock and mixed at low speed in an Eppenbach Homo-Mixer. Then 1.105 g of egg albumen is very slowly added, and the ingredients are mixed for 45 minutes at low speed to avoid aeration of the solution. The synthetic saliva should be refrigerated (40° F. maximum) in a sterilized container until used.

Two thousand grams of the synthetic saliva base stock are prepared by first adding 10 g of mineral salts solution to 1980 g of base solution. The mixture is autoclaved for 15 minutes at 20 psi and then allowed to cool to room temperature. Ten grams of sterilized urea solution is then added, and the solution is refrigerated in a sealed, sterilized container.

The 1980 g batch of base solution is made by first dissolving 8.0 g of gastric mucin in 700.0 g of distilled water using the Eppenbach mixer. The mucin is added slowly to avoid clumping. After addition is complete the mucin and water are mixed for 30 minutes at medium low speed. Aeration is to be avoided. Next, 8.4 g of potassium phosphate (dibasic), 6.4 g of potassium phosphate (monobasic), and 0.6 g of potassium hydroxide are dissolved in 1256.6 g of distilled water. The gastric mucin solution is added and the base solution is stirred until it is well mixed.

To make a 50 g batch of mineral salts solution, the following mineral salts are dissolved in 41.69 g of distilled water: 4.00 g of potassium chloride, 4.00 g of sodium chloride, 0.13 g of anhydrous sodium sulfate, and 0.18 g of magnesium chloride. Ten grams of this mineral salts solution is used in the synthetic saliva base stock.

Fifty grams of urea solution (of which 10 g are used in the saliva base stock) are prepared by dissolving 10 g of urea in 40 g of distilled water. The solution is filter sterilized using a Nalgen filter unit (Type S-0.45 micron, Sybron Corp.) and refrigerated in a sealed sterilized container.

Running the Disordering Temperature Test

One gram of product (fat or creme) and 1 g of synthetic saliva solution are placed into the bottom of a 16 mm.×100 mm. test tube. The product temperature should be below the disordering temperature of the fat (e.g., 70° F.). The supply of synthetic saliva should be kept at 40° F. during testing.

A thermocouple probe (digital thermometer 5.5" long, ⅛" diameter, accuracy ±0.1° F.) is used to measure the sample temperature and to stir the contents of the test tube. It is also used to scrape down any product smudged on the sides of the tube, so that the product and saliva collect in the bottom. Some product on the tube sides is acceptable if it can be mixed in during the agitation step.

The sample is heated in a constant temperature water bath (106°±4° F.) using the thermocouple probe to monitor sample temperature and to stir the sample, insuring uniform heating throughout. The tube is held in the water bath (with continuous stirring) until the sample temperature approaches the target temperature. Just before reaching the target temperature, the tube is removed from the bath. While monitoring the temperature and while continuing to stir, the tube is dipped in and out of the water bath. This allows the sample temperature to increase slowly at a more controllable rate. The dipping and stirring is continued until the target temperature is obtained (±0.2° F.). The sample should not be heated more than 0.2° F. over the target temperature.

When the sample reaches the target temperature, the tube is removed from the water bath and immediately dried off. It is then placed on a Vortex mixer (Vortex-Genie, Scientific Industries, Inc., Bohemia, NY) for 15 seconds at 2240 to 2560 rpm, while the thermocouple probe is held against one side of the tube to increase agitation. Although some cooling of the sample is acceptable, the intent of the test is to mix the sample for 15 seconds at the target temperature. If the sample cools more than 1° F., agitation should be stopped and the tube should be reheated in the water bath before further agitation. It is only necessary that the sample be mixed for 15 cumulative seconds (in contrast to consecutive seconds). If the sample temperature increases more than 0.2° F. over the target temperature during agitation, it should be allowed to cool to about 0.2° F. to 0.4° F. below the target temperature before further agitation.

When the target temperature is reached, the saliva/fat or saliva/creme sample is immediately poured out of the test tube into a sample cup. The visual appearance of the mixture is noted by using a microscope at 40×, and the conductivity is measured by using a Beckman 310 ohmeter. Conductivity is an indicator of whether the material is oil-continuous (greater than 20 megaohms) or water-continuous (less than 20 megaohms). A microscopic slide (no cover slip) is made by spreading the product/saliva mixture in a thin layer, and a photograph of a representative area is taken at 40×. FIGS. 3 through 9 can be referred to in order to determine the state of the sample. Data are collected in 2° F. even-numbered target temperature increments (e.g., 90° F., 92° F., 94° F.). Enough temperatures are evaluated to observe fully oil-continuous (FIGS. 3 and 7) to fully saliva-continuous (FIGS. 6 and 9) phases (emulsions).

The disordering temperature is the temperature at which the saliva/product forms fully dispersed water-continuous round oil droplets. At the next lower temperature the sample is not water-continuous or has not yet formed a majority of round oil droplets.

B. Back Extrusion Test (Creme)

The back extrusion test consists of an Instron crosshead pushing a piston into a creme sample for a specified period of time. The sample rests on an Instron compression load cell whose output is recorded by a strip chart. The chart records exerted force on the horizontal axis and time on the vertical axis.

Apparatus (Shown in FIG. 1)

Extrusion Tube (2)

The extrusion tube is a tube to hold the creme for analysis. It is made from a 10 cc syringe (B-D Yale, Benton Dickinson & Co.) with the tip end cut off at the 1 cc mark to allow for end loading or coring of the creme sample. The abbreviated syringe is 3.47" long, with an inside diameter of 0.574".

End Plug (4)

The end plug is a rigid plastic plug which fits snugly into the end of the extrusion tube, making it watertight. Dimensions of the portion inserted into the tube are: small diameter 0.557" and insert depth 0.197". Dimensions of the plug remaining outside the tube are: large diameter 0.714" and flange thickness 0.129".

Piston (6)

The piston is a plunger which is slowly pushed into the creme by an Instron crosshead. The piston has a plexiglass piston head (8) which is 0.560" in diameter and 2.56" long. The rod portion (10) of the piston is 0.250" in diameter and 1.69" long. The bottom or base (12) is 0.419" in diameter and 0.104" thick. The overall length of the piston is 4.354".

Sample Holder (14)

The sample holder is a plexiglass fixture that holds the extrusion tube in a vertical position and allows air to circulate around the tube to keep the sample temperature constant.

Instron Universal Testing Machine, Model No. TMS (Not Shown

The Instron has a compression load cell with a platform sitting directly below a crosshead. The sample sits on the load cell platform, and the crosshead is lowered to force the sample toward the load cell. Force on the sample (cell output) is measured electronically and recorded on a chart. In the instant case the sample holder (14) sits on the Instron load cell platform while the Instron crosshead pushes down on the piston (6). Load cell output is recorded on a chart recorder equipped with Instron paper type #101 (10 blocks per inch scale).

Water Bath

For bringing the creme sample to the desired testing temperature (70° F. or 80° F.±0.5° F.).

Creme Sample Tin

A 6-ounce seamless can Deep Style 22 (2.75" dia., 1.88" deep), Ellisco, Inc., Pennsauken, NJ. The creme sample tin is a storage tin with lid, convenient for holding the creme sample evaluated in this test.

Sample Preparation

The creme product should be uniformly packed with no air voids into a creme tin immediately after being made. Alternatively, it may be rolled into thin layers or sheets between waxed paper. Sample preparation should take place at a temperature of 70° F. A 10 cc extrusion tube and an end plug are selected. If the creme is in a tin, a creme sample is cored into the extrusion tube using a slow, rotating, downward motion of the tube into the creme. Care must be taken to avoid working the creme. To remove the creme sample from the tin, the thumb is placed over the flaired syringe top and the tube with the creme core inside is extracted. If the creme is in sheet form, repeated corings are made to fill the extrusion tube.

Creme should fill the extrusion tube from the bottom to the 5 cc marking (1.0" core length). There should be no voids in the creme core. If there is extra sample in the tube, it should be extruded out with a plunger until the tube is filled to the 5 cc mark. The piston can be used in this step as a plunger. The piston rod or base is grasped, and the piston head is inserted into the flaired top of the extrusion tube. The surplus creme is gently pushed out of the tube. Before removing the plunger, the excess creme extruded from the tube is trimmed off with a spatula or a thin-wire cutter. Then the end plug is placed into the bottom of the tube and the plunger is removed with a gentle, twisting motion.

The plugged extrusion tube is placed into a test tube holder resting in a water bath. The water bath must be kept at the target test temperature of 70° F. or 80° F. (±0.5° F.). The creme-filled tube is allowed to equilibrate in the 70° F. bath at least ten minutes before running the 70° F. back extrusion test. (The sample, prepared at 70° F., should already be close to the target test temperature.) For a target test temperature of 80° F., the creme-filled tube is allowed to equilibrate between 30 and 60 minutes before running the 80° F. back extrusion test.

Test Set-up

Air is pumped into the sides (16) of the jacket (18) of the sample holder (14). The air is a blend of warm and cold air which keeps the sample temperature constant. Air circulates around the extrusion tube, then escapes at the holder top (20) between the tube and the jacket. The air temperature control is set to the test temperature of 70° F. or 80° F. (±0.5° F.).

The crosshead of the Instron is set to descend on the sample at a rate of 0.5 inches per minute (ipm). The recording chart is run at 5 ipm. The Instron load cell is selected by sample stiffness. Usually a 2000 gram load cell is used. With this cell, the Instron can be set to measure either 100, 200, 500, 1000, or 2000 grams Full Scale. The setting is selected which gives the maximum resolution of the small forces involved, without overload. A 200 lb. load cell may also be used.

The creme-filled extrusion tube is removed from the water bath, thoroughly dried, and slipped down into the jacket of the sample holder. The thumb screw (22) is slightly tightened to hold the tube vertical. Then the piston is carefully placed into the tube. The piston base is gently rested on the surface of the creme in the bottom of the tube. The sample holder is placed onto the platform of the Instron load cell. The Instron crosshead is brought down until it almost touches the top of the piston head.

The Instron load cell is calibrated by taring the weight of the sample holder, extrusion tube with creme sample, and piston, using the balance control. The zero force is marked with the chart pen. Then the Full Scale Range selected is calibrated using appropriate weights. The recording chart is set to run continuously in the forward direction during the test.

Running the Test

The back extrusion test is run for 84 seconds, with the crosshead being lowered for 60 seconds (i.e., pushing the piston 0.5" into the creme sample), stopping for 24 seconds, then returning instantly upward to the start point. Timing of the 60 second downward motion begins when the chart pen records a force being exerted on the piston. The Instron crosshead commands are "down", "stop", then "return".

Figure 2:
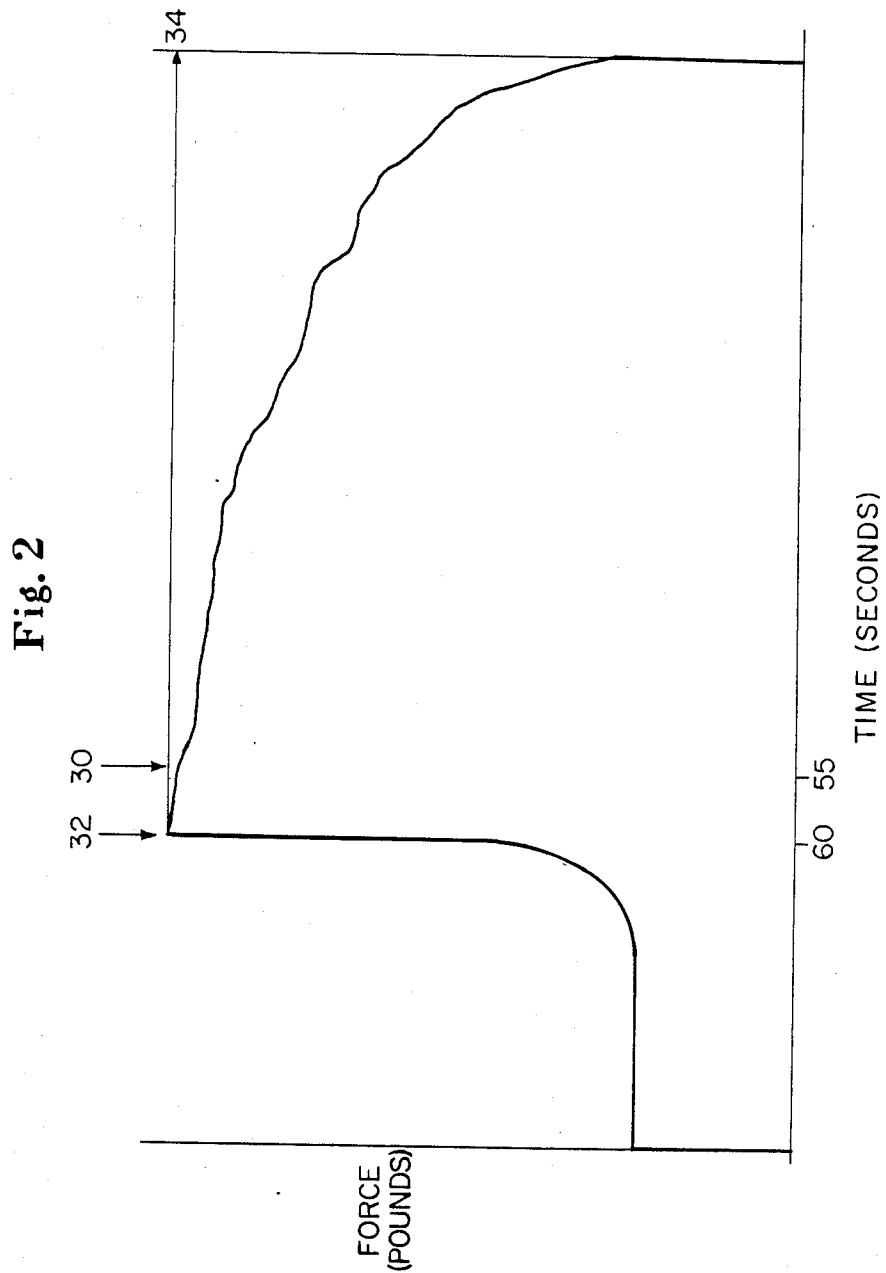
FIG. 2 shows a typical test chart for a back extrusion force test.
Figure 3:
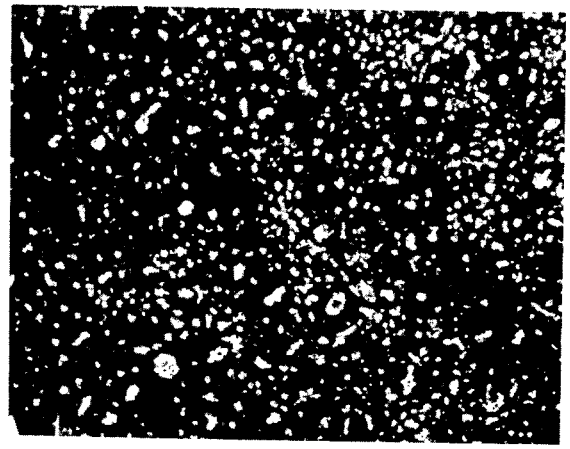
FIGS. 3 through 6 show a fat and saliva mixture. The fat is the dark phase.
Figure 4:
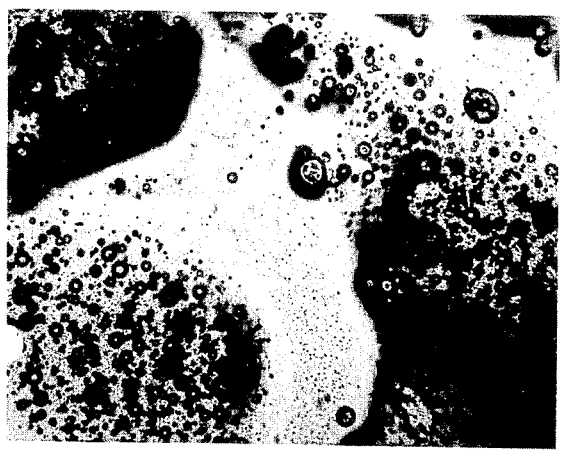
Figure 5:
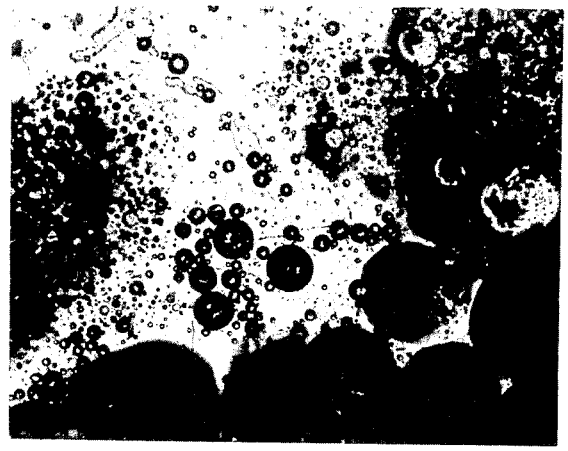
Figure 6:
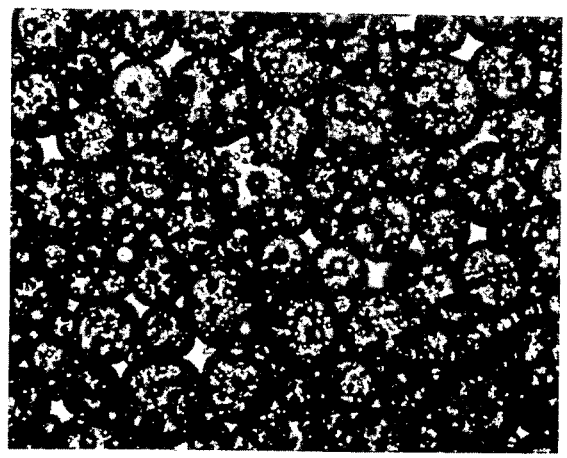
Figure 7:
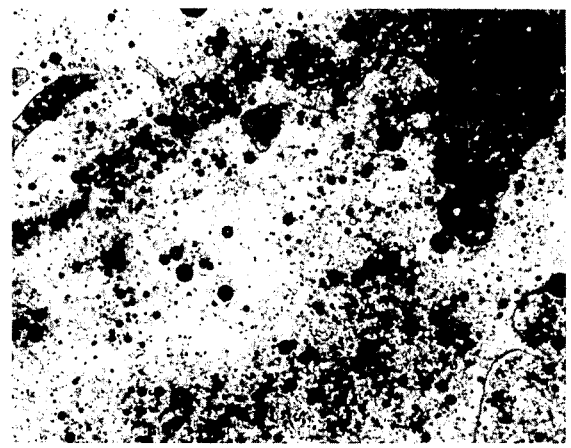
FIGS. 7 through 9 show the disordering process of a creme in saliva.
Figure 8:
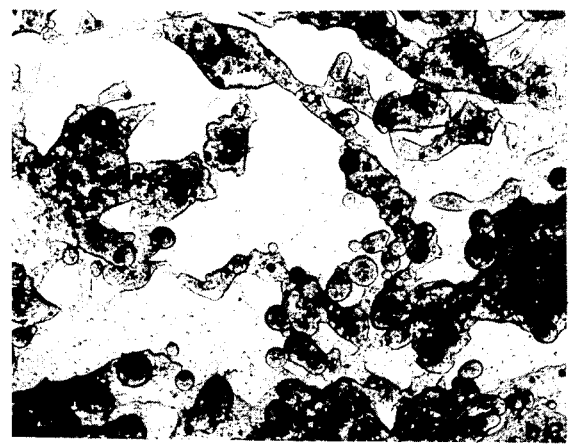
Figure 9:
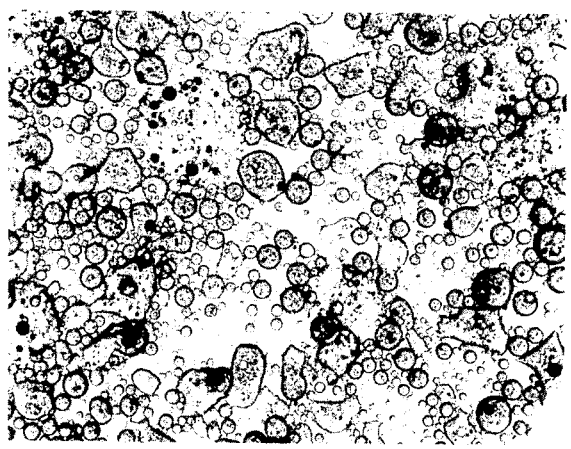

The back extrusion force is the average force exerted during the last 5 seconds of the downward piston motion into the creme. The chart is used to determine the average force between 55 and 60 seconds into the test run. If there is a discontinuity in this part of the creme (e.g., a bubble in the creme causes the force to rapidly drop, then recover), the data should be interpolated to accurately represent the force. FIG. 2 illustrates a typical back extrusion test chart. Force is plotted on the horizontal axis, while time is plotted on the vertical axis. In the chart illustrated, the back extrusion force between 55 seconds (30) and 60 seconds (32) was 0.47 lbs. (34).

The average of three replications of this test per creme sample constitutes the Average Back Extrusion Force (B.E.F.). This force is reported in pounds (lbs.).

C. Melt Rate Test

The melt rate test consists of measuring the time (in seconds) it takes for a stream of 92° F. water to melt a hole through a disc of creme one-quarter inch thick.

Apparatus

1" I.D. Copper Tube, 5" Long

The copper tube is used to core melt rate sample discs.

Figure 10:
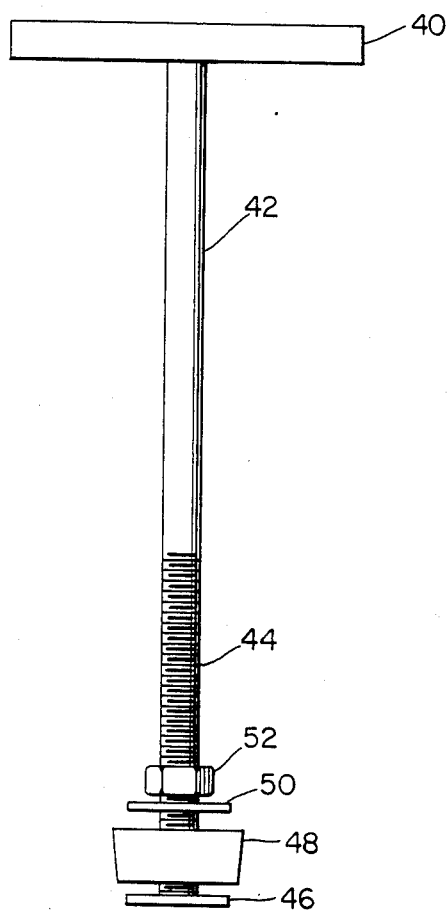
FIG. 10 is a diagram of a plunger used to extrude creme samples for a melt rate test.

Plunger (See FIG. 10)

The plunger, which fits into the copper tube, is used to extrude creme from the tube to be cut into melt rate sample discs. It also can be used as a suction device to pull creme into the tube for extrusion. The body of the plunger is made of 5/16" diameter stainless steel. It consists of a 3" long handle (40) connected to a 7-5/16" long shaft (42). The bottom 2⅞" of the shaft is threaded (44) with 5/16"—18 UNC thread. A 5/16" Type A plain washer Series W (46) is welded to the bottom of the shaft. Above the bottom washer is a round rubber plug (48), and above the plug is another washer (50) and then a hexagon nut (52). The rubber plug has a 1.10" diameter at its top end and a 1.03" diameter at its bottom end. When the plunger is inserted into the copper tube, the rubber plug fits snugly against the walls of the tube. The hexagon nut can be screwed down to squeeze the rubber plug, and thus clearance of the tube can be adjusted.

Copper Retaining Ring

The ring is made from 1" I.D. copper tube, cut 0.25" thick. It is slipped over the melt rate creme sample disc to contain the sample during the test.

Disposable Petri Dishes

The petri dishes are used to store the melt rate sample discs prepared for analysis.

Aluminum Foil Squares 1.25"×1.25" foil squares on which creme sample discs are placed.

Creme Sample Tin

The creme sample tin is a storage tin with lid, convenient for holding the creme sample evaluated in the melt rate test. A suggested tin is a 6 oz. seamless can Deep Style 22 (2.75" dia., 1.88" deep), made by Ellisco Inc., Pennsauken, NJ.

Timer

Stopwatch with ±1 second accuracy

Melt Rate Test Station (See FIG. 11)

The melt rate test station has a water supply with valves (60) to control the flow of hot and cold water. The water flows through flexible tubing (62) to an inlet control valve (64) which is adjusted to control flow rate. (Excess water flows out the bypass discharge [66]). A flowmeter (68) after the control valve measures the flow rate. From the flowmeter, the water flows through flexible tubing to a 0.25" I.D. glass tube (70) which is mounted vertically. The outlet of the glass tube is positioned 8.25 inches above the surface of a sponge (72) which acts as a sample platform. A thermocouple (74) with a digital readout is placed in the tubing to monitor water temperature. Target water temperature is 92° F. (±0.5° F.).

Sample Preparation

All sample preparation should be done in a 70° F. constant temperature room. Creme product should be uniformly packed with no air voids into a creme tin immediately after being made.

Creme sample is cored into the 1-inch diameter copper tube using a slowly rotating, downward motion of the tube into the creme. Care must be taken not to work the creme or compress it during this step. To remove the tube with the creme core intact, the tube is gently rocked back and forth in the tin. This should create an air space between the creme in the tin and the outside of the copper tube, thus reducing the suction effect when the tube is extracted. The open end of the tube is sealed by covering with the palm of a hand, and the tube is lifted upward out of the creme. The plunger (FIG. 10) is inserted into the open end of the tube and one-quarter inch of creme is slowly extruded. The extruded creme is cut off with a thin-wire cutter (cheese cutter) and discarded.

A spatula is used to smooth the surface of the creme exposed at the bottom of the tube. One-quarter inch of creme (measured with a ruler) is extruded and the wire cutter is used to cut off this one-quarter inch sample. After cutting, the creme disc is placed onto a 1.25" square of aluminum foil with the outside (smoothed side) of the sample up. The surface of the creme exposed in the tube is again smoothed and another one-quarter inch disc of sample is extruded. Five such discs are made and placed into a covered and labeled petri dish kept at 70° F. (±0.5° F.).

Several corings of creme with the copper tube are needed to obtain five sample discs without air voids or distorted shapes. The same creme tin may be re-cored if the creme has not been disturbed during the initial sample removal. Both the copper tube and the plunger should be wiped clean between corings.

If the creme is extremely viscous or fluid, it may be difficult to extract from the tin. If so, the plunger may be used to help pull out the creme. The plunger is first inserted to the bottom of the copper tube, then the sample is cored to a depth of one and one-half inches. While coring downward with the tube, the plunger is pulled up at the same rate. This avoids compressing the sample and allows no air between the sample core and the plunger. The tube is gently rocked back and forth, then extracted from the creme tin. Five creme sample discs are prepared in the manner previously described.

Running the Melt Rate Test (See FIG. 11)

A 0.25 inch I.D. glass tube delivers a steady flow of water to a sponge sample platform 8.25 inches below. The water flow rate is 0.53 gal./min. at a temperature of 92° F. (±0.5° F.). One sample disc (at 70° F.±0.5° F.) is removed from the petri dish with a spatula, with care being taken not to deform the sample. The disc is kept on the foil square. A one-quarter inch high, 1 inch diameter retaining ring is placed around the sample. There should be no gaps between the creme disc and the ring. (A small amount of surplus creme from the tin may be used to fill in tiny gaps, near the edges only). This keeps the water from backwashing under the creme disc and disrupting the test. The sample is placed on the sponge platform with the water stream striking the center of the disc, and the timer is started. When the sample has melted completely through directly under the water stream (silver foil is visible), the timer is stopped and the melt time is recorded. When all five samples have been run, the melt rate is reported as the average (in seconds) of the five trials. If a particular sample in a group of five shows an obviously erratic reading (i.e., sample fractures prematurely), this reading can be dropped at the discretion of the analyst.

D. Melting Point

The melting point of a solid or semi-solid substance is the temperature at which it changes into the liquid state. Chemically pure substances have sharp, well-defined melting points, but fats and oils exhibit gradual transformation to the liquid form, because they are mixtures of triglycerides, each constituent having a different individual melting point. Even pure triglycerides have irregular melting points, and in most cases, have a "double melting point". The first melting point is spoken of as the "transition point", and the higher, the "true melting point".

Since there is much uncertainty as to which of the two temperatures should be taken as the melting point, it is customary to report both points. It is also very essential to lay down well-defined rules of manipulation for any method used. Many methods have been proposed, but the one in commun use for fats and oils as well as crystalline materials is the "Capillary Tube Method".

Closed Capillary Tube Method

Apparatus

Melting point tube

Kimax Melting Point Capillary 0.8–1.2 mm I.D.; wall thickness 0.25 mm; length 100 mm. Cat. No. 34502 Kimble Laboratory Glassware or equivalent. The tubes should be kept in a clean, dry, tightly covered container. Each tube should be inspected just before use to be sure it is clean and dry.

Burner, for sealing tubes

Small blast lamp capable of giving small intense flame. Other type burners may be used if they can be adjusted to give a small intense flame.

Thermometer

A 0° to 65° C. thermometer graduated in 0.1° C. should be used. The thermometer should be checked against the Bureau of Standards thermometer whenever the accuracy is in doubt and at least every 6 months. A record of these standardizations should be kept. Corrections should be applied for differences over 0.1° C.

Magnifying Glass

A magnifying glass should be used in observing small changes.

Large cork 0.5 to 0.75 inch top section of the cork notched around the perimeter to hold tubes, with hole in center for insertion of thermometer.

Water bath

A 1000 ml beaker is used when only a few tests are made at one time. When a larger number of tests are to be made, the tubes may be attached to a large cork, in which case a 2 or 3 liter beaker should be used.

Agitation

Magnetic or mechanical stirrer large enough to give good agitation.

Heat

The beaker and contents may be heated by means of gas or electric "knife type" heater or electric coil submerged in the water.

Background

A black background directly behind the beaker and slightly to one side should be used.

Operation

Melt the sample on the steam bath and filter about 50 ml. A smaller sample may be used if only a limited amount is available. Dry this 50 ml of oil in a beaker by heating over a flame as rapidly as possible to 130° C. while stirring with a thermometer. (Sample must be completely dry.) Dip one end of each of two capillary tubes into the melted fat so that a column of fat 1 cm long is retained when the tubes are removed. (Samples are run in duplicate). Draw the column of fat into each tube so there is about 1 cm free space at the bottom of the tube. Seal off this bottom end of the tube in a small, intense flame.

Attach the melting point tubes to the cork in such a way that the portion of the tube containing the fat is not pushed through the cork. Tubes may be conveniently held by a 0.25 inch section of Gooch tubing or a single rubber band. Adjust the cork on the thermometer so that the samples are in the same plane as the center of the thermometer bulb. If any of the tubes are greasy they should be washed with alcohol and carefully dried.

Melt all samples by immersing the cork plus tubes in a hot water bath. Remove and quickly transfer to a crushed ice bath (0° to 3° C.). Samples should remain in the ice bath for 20–60 minutes.

Suspend the thermometer so that the bulb is in the center of the liquid in the water bath. The water bath should be about ⅔ full of water at 15°–20° C. Agitate the water in the beaker with the stirrer and start heating. The rate of heating should be 0.5° C. per minute. Rapid heating will give high results.

The complete fusion temperature is taken just when the last solid particle in the tube has disappeared. A small reading glass is helpful in observing these changes more closely. The tubes should be viewed against a black background.

The melting point of the two tubes should agree within 0.5° C. If not, the analysis should be repeated. Report the average of the two melting points.

E. Density

The density of a substance is defined as mass per unit volume. Density is most commonly expressed in either grams per milliliter (g/ml) or grams per cubic centimeter (g/cc).

A stainless steel density cup (No. 68470 from Vollrath, Sheboygan, Wis.) is weighed empty. The weight is recorded. Fill the cup with water until it is very nearly level with the top of the cup. Weigh the cup and water. Record the weight. Empty the cup and fill with creme filling. Record the weight.

Following is a sample calculation of density:
weight of cup=61.6 grams
weight of cup+water=272.0 grams
weight of the water=272−61.6=210.4 grams $$\text{Assuming density of water} = 1.0 \frac{\text{gram}}{\text{ml}}:$$

210.4 grams of water=210.4 ml of water
weight of cup+creme=275.4 grams
weight of creme=275.4−61.6=213.8 grams $$\text{density of the creme} = \frac{213.8 \text{ grams}}{210.4 \text{ ml}} = 1.016 \frac{\text{grams}}{\text{ml}}$$

F. Melting Profile

An important characteristic of the confectionery fat of the present application is its unique melting profile. The solids content of the fat at a particular temperature can be given in terms of a Solid Fat Content value (hereafter SFC value). An SFC value provides a reasonably accurate approximation of the percent by weight solids of the fat at a given temperature. By determining SFC values at a number of different temperatures, a melting profile of the fat can be obtained.

Before determining SFC values, the fat sample is heated to a temperature of 158° F. or higher for at least 0.5 hours or until the sample is completely melted. The melted sample is then tempered at a temperature of 80° F. for at least 0.5 hour (32° F. at least 12 hours for palm oil-containing blends). After tempering, the SFC value of the fat at a particular temperature can be determined by pulsed nuclear magnetic resonance (PNMR). The method for determining SFC values of a fat by PNMR is described in Madison and Hill, J. Amer. Oil Chem. Soc., Vol. 55 (1978), pp. 328-31 (herein incorporated by reference).

The sugar particle size is measured by Particle Data Inc. (Elmhurst, Ill.) which uses an electrozone counter. The "electrozone" counter determines the number and volume of particles in an electrically conductive liquid by application of a resistance principle. In application of this principle, a particle suspension flows through a small aperture having an immersed electrode on each side. The electrical resistance to the current applied to the electrodes is determined by the aperture size and electrolyte strength. As each particle passes through the aperture, it replaces its own volume of electrolyte within the aperture, thus momentarily changing the resistance value. This change produces a voltage pulse of short duration having a magnitude proportional to particle volume. The resultant series of pulses from the flow of a particle suspension through the aperture is electronically amplified, scaled and counted.

The average particle size of the sugar is a number average; i.e. the average of the number of particles of a given diameter.

The following Examples illustrate the invention herein, but are not meant to be limiting thereof.

EXAMPLE 1

|  | Grams |
|---|---|
| Fat Ingredients |  |
| Soybean oil - IV 107 | 75 |
| Soybean oil - S39* | 75 |
| Coconut oil - IV 8 | 150 |
| Creme Ingredients |  |
| 12X sucrose | 645.5 |
| Lecithin | 0.5 |
| Polysorbate 80 | 0.2 |
| Nonfat milk solids | 50.0 |
| Flavor | 0.8 |
| Salt | 3.0 |
| Fat | 300.0 |

*39% solids at 70° F.

The soybean oils (I-107 & S-39) were blended together, melted at about 130° F. The mixture was solidified in a Votator (scraped surface heat exchanger) at 64° F. The Votator had 3 scraper blades turning at about 20 scrapes/second. The mixture was then passed through a picker box where the mixture experienced a 16° F. temperature rise to 80° F. at 75 rpm and a flow rate of about 350 lbs/hr. The soybean mixture was then cubed and stored in a 60° F. environment.

The coconut oil was mixed with the soybean oil at about 75° F. until homogeneous.

The confectioners fat has a melting profile of:

| Temperature | % Solids |
|---|---|
| 50° F. | 46 |
| 70° F. | 12 |
| 80° F. | 2.9 |
| 92° F. | 1.0 |
| 105° F. | 0.0 |

The complete melting point is 86° F. The disordering temperature is 90° F.

When the creme filling was made, the soybean oil mixture, coconut oil, and minors (lecithin, polysorbate 80, flavor, and salt) were mixed in a Hobart mixer (Model A-200T) for 1 minute at 107 rpm, 1 minute at 198 rpm, and 1 minute at 361 rpm. The bowl and paddle were scraped down after each speed change or ingredient addition. The sugar and nonfat milk solids were then added in small portions, about a third each time, and the mixture was then mixed at 107 rpm for 2 minutes between each addition. After the last of the sugar and nonfat milk solids were added, the creme was mixed for 5 minutes at 198 rpm.

The melt rate of the creme is 27 seconds. The disordering temperature is 88° F. The back extrusion force is 2.9 lbs. force at 70° F. and 1.3 lbs. force at 80° F.

12X sugar has a particle size distribution of:

| Particle Size | Percent |
|---|---|
| Greater than 30 microns | 2 |
| Less than or equal to 21 microns | 99 |
| Less than or equal to 9 microns | 94 |

EXAMPLE 2

| Shortening Ingredients | Percent |
|---|---|
| Soybean oil - IV 107 | 60 |
| Soybean oil - S-39 | 10 |
| Coconut oil - IV 2 | 30 |

| Creme Ingredients | Grams |
|---|---|
| Shortening | 1580.0 |
| 12X sugar | 3397.85 |
| Lecithin | 2.65 |
| Polysorbate 80 | 1.05 |
| Flavor | 2.65 |
| Salt | 15.80 |

The oils were blended together, and melted at about 127° F. The mixture was solidified in a Votator (scraped surface heat exchanger) at 58° F. The Votator had three scraper blades turning at about 20 scrapes/second. The mixture was then passed through a picker box at 75 rpm, flow rate about 350 lbs/hour at 60° F. The fat mixture was then cubed and stored in a 50° F. environment.

A small amount (about 5%) of the total fat mixture was mixed in a small beaker with the lecithin, Polysorbate 80, and flavoring ingredients. This mixture was then mixed with the remaining fat mixture (shortening) in a Hobart Mixer (Model A200-T) for 1 minute at 107 rpm, 1 minute at 198 rpm, and 1 minute at 361 rpm. The bowl and paddle were scraped down after each speed change or ingredient addition. The sugar was then added in small portions, about a third each time, and the mixture was then mixed at 107 rpm for 2 minutes between each addition. After the last of the sugar was added, the creme was mixed for 5 minutes at 198 rpm. The creme was excellent on a base cake of a sandwich cookie.

Solid fat content of the fat:

| Temperature | Percent |
|---|---|
| 50° F. | 26.1 |
| 70° F. | 6.6 |
| 80° F. | 3.8 |
| 92° F. | 1.4 |
| 105° F. | 0.0 |

The creme has the following properties:
Disordering temperature: 92° F.
Back extrusion force at 70° F.: 0.95 lbs.
Melt rate at 92° F.: 39.2 seconds

EXAMPLE 3

| Creme ingredients | Percent |
| --- | --- |
| Shortening (Example 1) | 34.5 |
| Lecithin | 0.05 |
| Polysorbate 80 | 0.02 |
| Flavor | 0.35 |
| 12X sugar | 45 |
| Aytex wheat starch | 20 |

The soybean oil, coconut oil and minors (lecithin, polysorbate 80, flavor and salt) were mixed in a Hobart mixer (Model A200T) for about 1 minute at 107 rpm, 1 minute at 198 rpm and 1 minute at 361 rpm. The bowl and paddle were scraped down after each speed change or ingredient addition. The sugar and nonfat milk solids were then added in small portions, about one-third each time, and the mixture was then mixed at 107 rpm for 2 minutes between each addition. After the last of the sugar and nonfat milk solids were added, the creme was mixed for 5 minutes at 198 rpm. The creme had the following properties:
Melt rate: 27 seconds at 92° F.
Disordering temperature: 90° F.
Back extrusion force 70° F. (0.75 lbs)

What is claimed is:

1. A substantially water-free confectionery creme comprising:
    (a) 50% to 80% of a carbohydrate having an average particle size of less than 30 microns;
    (b) 20% to 50% of a confectionery fat, said fat comprising coconut oil, said fat having a solid fat content ranging from about 10% to about 55% at 50° F. and from about 3% to about 17% at 70° F., fat having a complete melting point from about 80° F. to about 98° F.;
    (c) 0% to about 2% emulsifier; said creme being characterized by:
    (a) a back extrusion force of from about 0.3 to about 6 lbs. at 70° F.;
    (b) a disordering temperature of less than 102° F.; and
    (c) a melt rate of from about 15 seconds to about 75 seconds at 92° F.

2. A confectionery creme according to claim 1 which has a density of between 0.7 to about 1.2 g/cc.

3. A confectionery creme according to claim 2 which has a melt rate of from about 15 seconds to about 60 seconds.

4. A confectionery creme according to claim 3 wherein the fat additionally comprises an oil selected from the group consisting of soybean oil, palm oil, cottonseed oil and mixtures thereof.

5. A confectionery creme according to claim 4 wherein the carbohydrate particle size distribution is:
    (a) 2% or less greater than 25 microns in size;
    (b) 15% or less 10 to 25 microns in size; and
    (c) 83% or less than 10 microns in size.

6. A confectionery creme according to claim 5 wherein the carbohydrate consists essentially of sucrose.

7. A creme according to claim 6 wherein the fat comprises from 20% to 40% of the creme.

8. A creme according to claim 5 wherein the carbohydrate comprises starch at a level of from 10% to about 25% of the creme.

9. A creme according to claim 8 wherein the fat comprises a mixture of coconut oil and soybean oil.

10. A creme according to claim 9 wherein the fat comprises from 20% to 40% of the creme.

11. A creme according to claim 10 wherein the disordering temperature is between 80° F. and 98° F.

12. A confectionery creme according to claim 1 wherein the solid fat content of the confectionery fat is:
    (1) from about 10% to about 55% at 50° F.;
    (2) from about 3% to about 17% at 70° F.;
    (3) from about 1% to about 5% at 80° F.;
    (4) less than about 2% at 92° F.; and
    (5) less than about 1% at 105° F.

13. A confectionery creme according to claim 12 which has a density of between 0.7 to about 1.2 g/cc.

14. A confectionery creme according to claim 13 which has a melt rate of from about 15 seconds to about 60 seconds.

15. A confectionery creme according to claim 14 wherein the fat additionally comprises an oil selected from the group consisting of soybean oil, palm oil, cottonseed oil and mixtures thereof.

16. A confectionery creme according to claim 15 wherein the solid fat content of the confectionery fat is:
    (a) from about 15% to about 47% at 50° F.;
    (b) from about 4% to about 12% at 70° F.;
    (c) from about 2.5% to about 5% at 80° F.;
    (d) from about 0% to about 2% at 92° F.;
    (e) less than 0.5% at 105° F.

17. A confectionery creme according to claim 16 wherein the carbohydrate particle size distribution is:
    (a) 2% or less greater than 25 microns in size;
    (b) 15% or less 10 to 25 microns in size; and
    (c) 83% or less than 10 microns in size.

18. A confectionery creme according to claim 17 wherein the carbohydrate consists essentially of sucrose.

19. A creme according to claim 17 wherein the fat comprises from 20% to 40% of the creme.

20. A creme according to claim 19 wherein the carbohydrate comprises starch at a level of from 10% to about 25% of the creme.

21. A creme according to claim 16 wherein the fat comprises a mixture of coconut oil and soybean oil.

22. A creme according to claim 21 wherein the fat comprises from 20% to 40% of the creme.

23. A creme according to claim 22 wherein the disordering temperature is between 80° F. and 98° F.

24. A confectionery creme according to claim 1 wherein the confectionery fat comprises a mixture of coconut oil and soybean oil containing from about 10% to about 60% coconut oil.

25. A confectionery creme according to claim 31 wherein the solid fat content of the confectionery fat is
    (1) from about 10% to about 55% at 50° F.;
    (2) from about 3% to about 17% at 70° F.;
    (3) from about 1% to about 10% at 80° F.;
    (4) less than about 2% at 92° F.; and
    (5) less than about 1% at 105° F.

26. A confectionery creme according to claim 25 wherein the solid fat content of the confectionery fat is
    (1) from about 10% to about 55% at 50° F.;
    (2) from about 3% to about 17% at 70° F.;
    (3) from about 1% to about 5% at 80° F.;
    (4) less than about 2% at 92° F.; and (5) less than about 1% at 105° F.

27. A confectionery creme according to claim 26 wherein the coconut oil constituent of the confectionery fat is hydrogenated to an IV ranging from about 1.5 to about 4 and wherein soybean oil which is present in the confectionery fat has IV ranging from about 35 to about 110.

28. A confectionery creme according to claim 27 wherein said creme is characterized by a back extrusion force of from about 0.3 to about 3 lbs. at 70° F.

29. A sandwich cookie comprising:
(a) base cake;
(b) a substantially water-free confectionery creme comprising:
  (1) 50% to 80% of a carbohydrate having an average particle size of less than 30 microns;
  (2) 20% to 50% of confectionery fat, said fat comprising coconut oil, said fat having a solid fat content ranging from about 10% to to about 55% at 50° F. and from about 3% to about 17% at 70° F., said fat having a complete melting point from about 80° F. to about 98° F.;
  (3) 0% to about 2% emulsifier; said creme being characterized by:
    (i) a back extrusion force of from about 0.3 to about 6 lbs. at 70° F.;
    (ii) a disordering temperature of less than 102° F.; and
    (iii) a melt rate of from about 15 seconds to about 75 seconds at 92° F.

30. A sandwich cookie according to claim 29 comprising two base cakes and a substantially water-free confectionery creme having 20% to about 40% fat and wherein the carbohydrate consists essentially of sucrose.

31. A sandwich cookie according to claim 30 wherein said fat consists of a mixture of coconut oil and soybean oil.

32. A sandwich cookie according to claim 31 wherein said fat has a solid fat content of:
(a) from about 15% to about 47% at 50° F.;
(b) from about 4% to about 12% at 70° F.;
(c) from about 2.5% to about 5% at 80° F.;
(d) from about 0% to about 2% at 92° F.;
(e) less than 0.5% at 105° F.

33. A sandwich cookie according to claim 32 wherein said carbohydrate has a particle size distribution of:
(a) 2% or less greater than 25 microns in size;
(b) 15% or less 10 to 25 microns in size; and
(c) 83% or less than 10 microns in size.

34. A sandwich cookie according to claim 29 wherein the confectionery fat comprises a mixture of coconut oil and soybean oil containing from about 10% to about 60% coconut oil.

35. A sandwich cookie according to claim 34 wherein the solid fat content of the confectionery fat is
(1) from about 10% to about 55% at 50° F.;
(2) from about 3% to about 17% at 70° F.;
(3) from about 1% to about 10% at 80° F.;
(4) less than about 2% at 92° F.; and
(5) less than about 1% to 105° F.

36. A sandwich cookie according to claim 35 wherein the solid fat content of the confectionery fat is
(1) from about 10% to about 55% at 50° F.;
(2) from about 3% to about 17% at 70° F.;
(3) from about 1% to about 5% at 80° F.;
(4) less than about 2% at 92° F.; and
(5) less than about 1% at 105° F.

37. A sandwich cookie according to claim 36 wherein the coconut oil constituent of the confectionery fat is hydrogenated to an IV ranging from about 1.5 to about 4 and wherein soybean oil which is present in the confectionery fat has IV ranging from about 35 to about 110.

38. A sandwich cookie according to claim 37 wherein said creme is characterized by a back extrusion force of from about 0.3 to about 3 lbs. at 70° F.

* * * * *